R. NORTON.
POTATO PEELING AND CLEANING MACHINE.
APPLICATION FILED JUNE 22, 1920.

1,436,519.

Patented Nov. 21, 1922.

Inventor
R. Norton
By Geo. P. Kimmel
Attorney

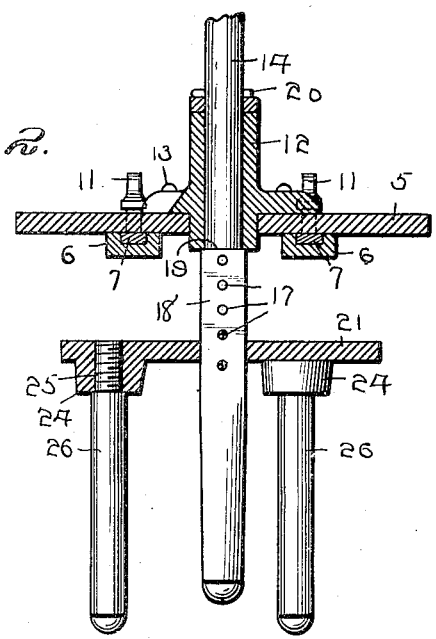
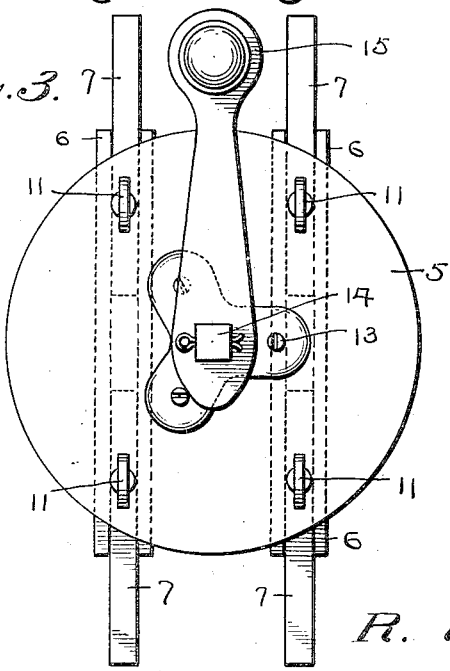

Patented Nov. 21, 1922.

1,436,519

UNITED STATES PATENT OFFICE.

RICHARD NORTON, OF SACRAMENTO, CALIFORNIA.

POTATO PEELING AND CLEANING MACHINE.

Application filed June 22, 1920. Serial No. 390,795.

*To all whom it may concern:*

Be it known that I, RICHARD NORTON, a citizen of the United States, residing at Sacramento, in the county of Sacramento and State of California, have invented certain new and useful Improvements in a Potato Peeling and Cleaning Machine, of which the following is a specification.

This invention has for its object to provide a device for removing the skins and cleaning such vegetables as potatoes wherein the rotatable cleaning and peeling element is supported in a plate equipped with such clamping devices that the same may be readily applied to various types of ordinary kitchen utensils such as buckets for cleaning vegetables deposited therein.

A further object is the provision of a device of this character embodying improved features of adjustment by which the device is readily adapted to buckets or receptacles of various types and sizes and furthermore for facilitating swift peeling and cleaning of the vegetables.

With these and other objects in view, the invention consists in certain novel features of construction as hereinafter shown and described and then specifically pointed out in the claims and in the drawings illustrative of the preferred embodiment of the invention.

Figure 1 represents a side elevation of the invention, the bucket or container being shown in section.

Fig. 2 represents an enlarged fragmentary vertical sectional view through the cleaner and peeler detached from the bucket.

Fig. 3 represents a top plan view thereof, and,

Figure 1:
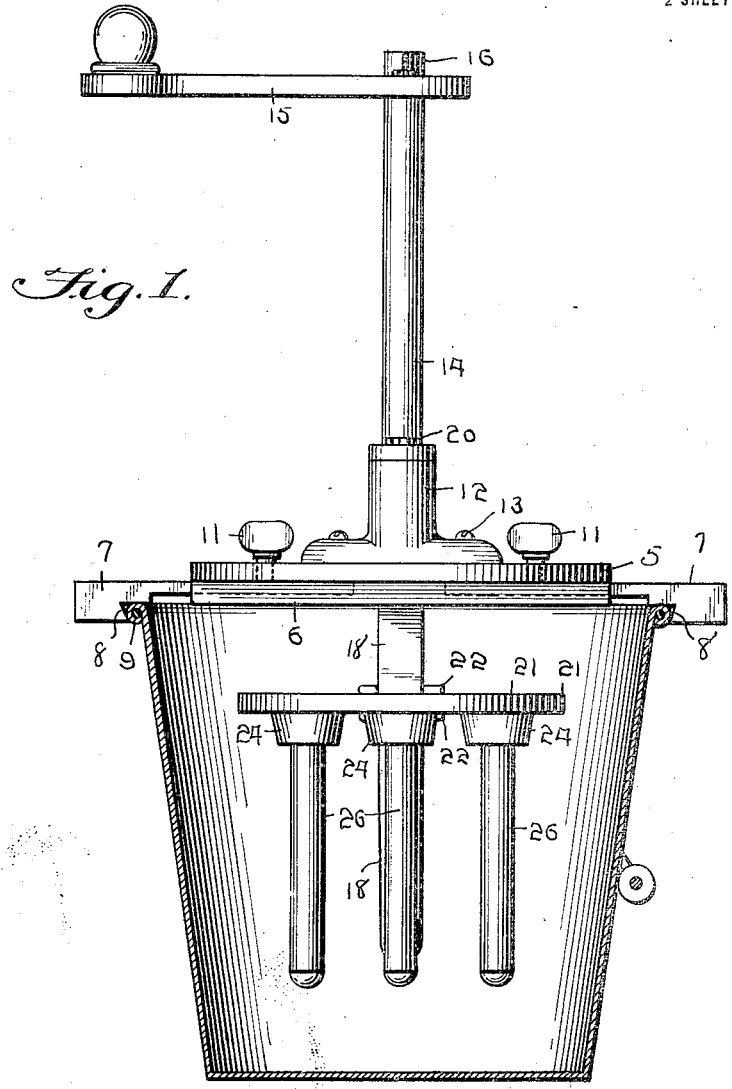
Figure 4:
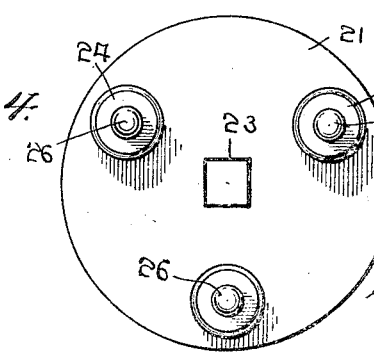
Fig. 4 represents a bottom plan view of the cleaning and peeling element.

Referring to the drawing in detail, wherein similar reference numerals designate corresponding parts throughout the several views, the numeral 5 indicates the supporting plate which is preferably circular in form and constitutes the support for the parts of the cleaning and peeling device and furthermore provides a cover for the bucket or other container to which the device is applied. Longitudinally channeled and parallel guides 6 are arranged underneath of the supporting plate 5 on opposite sides of a plane disposed diametrically of the plate 5 and lying between and parallel to the guides and support the slidable clamps 7 having undercut shoulders 8 on the undersides and adjacent the outer ends thereof so as to effectively embrace the beaded top edge 9 of a bucket or other container 10 to rigidly maintain the device in position thereon. As clearly shown in Fig. 3, the clamps 7 are arranged in pairs, the clamps of each pair being arranged in one of the channeled guides 6 and having the undercut shoulders 8 arranged in opposed relation so as to embrace the beaded edge 9 of the container at opposed points. The clamps are mounted for longitudinal adjustment in the guides 6 and are held in adjusted position by set screws 11 the threaded shanks of which are fitted in internally threaded openings provided in the supporting plate 5 whereby upon proper adjustment of the screws the terminals of the threaded shanks thereof are brought into engagement with the clamps 7 to maintain the latter in adjusted position.

An upright bearing member 12 is rigidly secured at 13 concentrically of the outer edge of the supporting plate 5 and rotatably supports the vertically disposed drive shaft 14 having a demountable handle 15 fitted upon the upper squared terminal 16 thereof and having a series of spaced transverse apertures 17 formed in the lower squared terminal 18 thereof. The longitudinal movement of the shaft with relation to the bearing member 12 is limited, in one direction, by the shoulder 19 defined by the square terminal 18 of the shaft whereas the shaft is normally held against longitudinal movement in the opposite direction by a cotter pin 20 fitted in a diametrical opening formed in the portion of the shaft directly above the bearing member 12. The upper squared extremity 16 is of such size as to permit its withdrawal through the bearing member 12 for convenience in removing the parts of the cleaning and peeling device for transportation or storage.

The transverse apertures 17 in the lower squared terminal of the drive shaft 14 are spaced apart a distance approximately equal to the thickness of the supporting disk 21 and receive removable cotter pins 22 whereby the disk 21 is effectively secured in adjusted position longitudinally of the drive shaft. The supporting disk 21 is provided with a centrally disposed polygonal aperture 23 receiving the polygonal lower portion 18 of the drive shaft whereby a non-rotatable connection between these parts is established. The underside of the disk 21 is provided with a plurality of circular bosses 24 having vertical internally threaded apertures 25 therein receiving the reduced threaded upper terminals of peeling and cleaning fingers 26 which latter project downwardly from the disk 21 in spaced parallel relation to the lower polygonal extremity of the shaft 14, which latter is extended considerable distance below the disk 21 and, being of polygonal form, materially assists the cleaning and peeling action of the fingers 26 by engaging the vegetables in the receptacle.

In use, the supporting plate 5 may be readily applied over the upper open end of various types of receptacles 10 and is securely held in position thereon by proper adjustment of the clamps 7, the under cut shoulders 8 of which effectively embrace the beaded edge 9 of the receptacle preventing lateral movement or upward displacement of the plate 5 from the receptacle. Lateral displacement of the plate 5 from the receptacle 10 is effectively prevented owing to the arrangement of the clamps 7 on opposite sides of the center of the receptacle. Potatoes or other vegetables to be peeled and cleaned having been introduced in the receptacle 10, the shaft 14 is rotated by the hand crank 15 thus setting the fingers 26 in operation causing agitation of the contents of the receptacle. The rolling movement of the vegetables incident to the movement of the fingers 26 causes the skins thereof to be removed and subsequent to the removal of such skins, water or other cleaning liquid may be introduced in the receptacle 10 for removing the vegetables from the skins.

What I claim is:

1. A potato peeling machine comprising a container, a rotatable shaft extending therein and having cylindrical upper and lower portions and a polygonal intermediate portion projecting laterally from the upper cylindrical portion, a potato peeling device carried by said shaft, a shaft supporting element mounted on the container and including a vertically disposed bearing for said shaft, said polygonal intermediate portion of said shaft abutting against the lower end of said bearing to arrest upward movement of said shaft, and means carried by the upper end of the shaft and engaging the upper end of said bearing to arrest downward movement of the shaft.

2. A potato peeling machine comprising a container, a rotatable shaft extending therein and provided with cylindrical upper and lower portions and a polygonal intermediate portion provided with a vertical row of transversely extending superposed openings, a vertically adjustable potato peeling device mounted on the polygonal portion of said shaft, and transversely extending adjustable elements mounted in a pair of said openings for maintaining said device in its adjusted position.

In testimony whereof, I affix my signature hereto.

RICHARD NORTON.